(12) United States Patent
Lammert et al.

(10) Patent No.: US 9,053,919 B2
(45) Date of Patent: Jun. 9, 2015

(54) MINIATURE TOROIDAL RADIO FREQUENCY ION TRAP MASS ANALYZER

(75) Inventors: Stephen A. Lammert, Glenburn, ME (US); Samuel E. Tolley, Springville, UT (US); Jeffrey L. Jones, Orem, UT (US); Randall W. Waite, Springville, UT (US); Edgar D. Lee, Highland, UT (US); Milton L. Lee, Pleasant Grove, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 1714 days.

(21) Appl. No.: 11/639,373

(22) Filed: Dec. 13, 2006

(65) Prior Publication Data

US 2012/0267523 A1     Oct. 25, 2012

(51) Int. Cl.
| | |
|---|---|
| H01J 49/36 | (2006.01) |
| H01J 49/04 | (2006.01) |
| H01J 49/42 | (2006.01) |
| H01J 49/00 | (2006.01) |
| B01D 59/44 | (2006.01) |

(52) U.S. Cl.
CPC ............. *H01J 49/424* (2013.01); *H01J 49/422* (2013.01); *H01J 49/423* (2013.01); *H01J 49/4225* (2013.01); *B01D 59/44* (2013.01); *H01J 49/0013* (2013.01)

(58) Field of Classification Search
CPC . H01J 49/0013; H01J 49/422; H01J 49/4225; H01J 49/423; H01J 49/424; B01D 59/44
USPC .......... 250/281, 292, 291, 290, 283
See application file for complete search history.

(56) References Cited

U.S. PATENT DOCUMENTS

| | | | | | |
|---|---|---|---|---|---|
| 5,420,425 | A | * | 5/1995 | Bier et al. ................ | 250/291 |
| 5,650,617 | A | * | 7/1997 | Mordehai ................ | 250/291 |
| 6,087,658 | A | * | 7/2000 | Kawato ................... | 250/292 |
| RE36,906 | E | * | 10/2000 | Franzen et al. .......... | 250/291 |
| 6,770,871 | B1 | * | 8/2004 | Wang et al. .............. | 250/281 |
| 2003/0089846 | A1 | * | 5/2003 | Cooks et al. ............. | 250/281 |
| 2004/0195504 | A1 | * | 10/2004 | Senko et al. ............. | 250/291 |
| 2005/0029445 | A1 | | 2/2005 | Lee et al. | |
| 2006/0219888 | A1 | * | 10/2006 | Jachowski et al. ....... | 250/281 |
| 2010/0163724 | A1 | * | 7/2010 | Verbeck, IV ............. | 250/283 |

FOREIGN PATENT DOCUMENTS

| | | |
|---|---|---|
| JP | 2001084954 A | 3/2001 |
| WO | WO 02/091427 A2 | 11/2002 |

OTHER PUBLICATIONS

Prazeller et al., "Proton transfer reaction ion trap mass spectrometer" Rapid Commun. Mass Spectrom. 2003; 17: 1593-1599.*

(Continued)

*Primary Examiner* — Nicole Ippolito
*Assistant Examiner* — Wyatt Stoffa
(74) *Attorney, Agent, or Firm* — Morriss O'Bryant Compagni, PC

(57) ABSTRACT

A scaled down version of a toroidal radio frequency (RF) ion trap mass analyzer operating with RF trapping voltages on the order of 1 kV$_{p-p}$ yet despite the reduced dimensions, retains roughly the same ion trapping volume as conventional 3D quadrupole ion traps, wherein the curved geometry enables construction of a compact mass analyzer and easy interface with conventional electron multipliers.

30 Claims, 11 Drawing Sheets

(56) References Cited

OTHER PUBLICATIONS

Lammert, S. et. al., "Miniature Toroidal Radio Frequency Ion Trap Mass Analyzer" J Am Soc Mass Spectrom 2006, 17, 916-922.*

Lammert, S.A., et al., "Design, optimization and initial performance of a toroidal rf ion trap mass spectrometer" International Journal of Mass Spectrometry 212 (2001) 25-40.*

Lammert, S.A., et al., "Design, optimization and initial performance of a toroidal rf ion trap mass spectrometer" International Journal of Mass Spectrometry 212 (2001).*

Prazeller, et al. "Proton transfer reaction ion trap mass spectrometer", Rapid Communications in Mass Spectromentry, vol. 17, pp. 1593-1599, Jon Wiley & Sons, Ltd. 2003.

Lammed, Stephen A., et al. "Design, optimization and initial performance of a toroidal rf ion trap mass spectrometer". International Journal of Mass Spectrometry 212 (2001) 25-40. Elsevier Science.

Schwartz, Jae C., et al. "A two-dimensional quadrupole ion trap mass spectrometer". Journal of American Society for Mass Spectrometry 2002, 13, 659-669. Elsevier Science.

* cited by examiner

MINIATURE TOROIDAL RADIO FREQUENCY ION TRAP MASS ANALYZER This invention was made with Government support under contract number DTRA 01-03-C-0047 PZ0001 with the Department of Defense, Defense Threat Reduction Agency, and under contract number DABJ 19-03-C-0005 with Dugway Proving Ground.

CROSS REFERENCE TO RELATED APPLICATIONS

This document claims priority to, and incorporates by reference all of the subject matter included in the U.S. Provisional Patent Application, with Ser. No. 60/750,277 and filed on Dec. 13, 2005.

BACKGROUND OF THE INVENTION

1. Field of the Invention

This invention relates generally to storage, separation and analysis of ions according to mass-to-charge ratios of charged particles and charged particles derived from atoms, molecules, particles, sub-atomic particles and ions. More specifically, the present invention is a relatively small and portable device for performing mass spectrometry using a miniature toroidal configuration for a mass analyzer.

2. Description of Related Art

Mass spectrometry continues to be an important method for identifying and quantifying chemical elements and compounds in a wide variety of samples. High sensitivity and selectivity of mass spectrometry are especially useful in threat detection systems (e.g. chemical and biological agents, explosives) forensic investigations, environmental on-site monitoring, and illicit drug detection/identification applications, among many others. Thus, the need for a reliable mass analyzer that can perform in-situ makes a portable device even more relevant. Some key elements in developing portable mass spectrometers are reduction in size, weight and power consumption, along with reduced support requirements and cost.

Ion trap (IT) mass analyzers, by virtue of their simplicity, were selected by the inventors as candidates for miniaturization. For example, IT analyzers are inherently small, even as implemented commercially. IT analyzers have only a few ion optic elements, which do not require highly precise alignment relative to other types of mass analyzers. In addition, because they are trapping devices, multiple states of mass spectrometry (MS) can be performed in a single mass analyzer. The operating pressure for ion traps is higher than other forms of mass spectrometry allowing for less stringent pumping requirements. Furthermore, because the radio frequency (RF) trapping voltage is inversely proportional to the square of the analyzer radial dimension, a modest decrease in analyzer size results in a large reduction in operating voltage. This in turn results in lower power requirements. An added potential benefit of the reduced analyzer size is the shorter ion path length which may ease the vacuum requirements even further. As a practical matter, the shorter ion path length is especially important as some of the most limiting aspects of MS miniaturization are not in the ion optic components, but rather in the vacuum and other support assemblies.

The ability to miniaturize ion trap mass spectrometers hinges on several issues, including space charge and machining tolerance limits. Miniature ion traps exist today using conventional ion trap geometries (i.e. hyperbolic surfaces).

To understand the difference in relative size of the invention and state of the art devices, it should be understood that for this document, a conventional or full-scale toroidal and 3D mass analyzer, the radius of the toroidal trapping volume, also known as $r_0$, is nominally considered to be approximately 1 cm.

It is also important that as these devices become smaller, the machining tolerances play an increasingly significant role in trapping field defects. Thus, it would be an advantage over the prior art to simplify the geometry to a design that is more easily machined.

Cylindrical ion trap mass analyzers have been miniaturized because the simplified, straight lines of a cylinder are considerably easier to machine than hyperbolic surfaces, especially in small dimensions. When the geometry of the analyzer electrodes deviates significantly from the theoretical geometry, as is the case for cylindrical ion traps, corrections are needed to restore the trapping field potentials to their theoretical values. Modeling and simulation programs have been used extensively in this undertaking.

Disadvantageously, the gains from reducing analyzer size (e.g. increased portability due to lower weight and smaller size, lower RF generator power, and relaxed vacuum requirements) are understandably offset by a reduction in ion storage capacity in state of the art mass analyzers. Concomitant with this reduced capacity is an earlier onset of space charge conditions, based on ion-ion repulsion, which results in reduced mass resolution and mass peak shifts. Efforts to address this constraint in ion mass spectrometers have lead to several different approaches. For example, arraying several reduced volume cylindrical ion traps is one approach to recovering the lost ion capacity. More recently, linear ion traps with either radial or axial ejection have also been developed. The increased ion storage capacity is due to the volume available throughout the length of the two-dimensional quadrupole rod array. These devices are now readily available in commercial versions.

For reasons similar to those where cylindrical ion trap geometries are used to approximate the 3D quadrupolar ion trapping field, a rectilinear ion trap has been reported that uses a rectangular rod assembly instead of the more conventional hyperbolic quadrupole rod surface. All of these linear devices provide an increase in ion storage capacity by employing a traditional 2D quadrupole with ion gates on either end of the quadrupole array. Arrays of linear quadrupoles have also been reported.

BRIEF SUMMARY OF THE INVENTION

In a first embodiment, the present invention is approximately a ⅕ scale version of a toroidal radio frequency (RF) ion trap mass analyzer operating with RF trapping voltages less than ca. 1 $kV_{p-p}$ yet despite the reduced dimensions, retains roughly the same ion trapping volume as conventional 3D quadrupole ion traps, wherein the curved geometry enables construction of a compact mass analyzer and easy interface with conventional electron multipliers.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
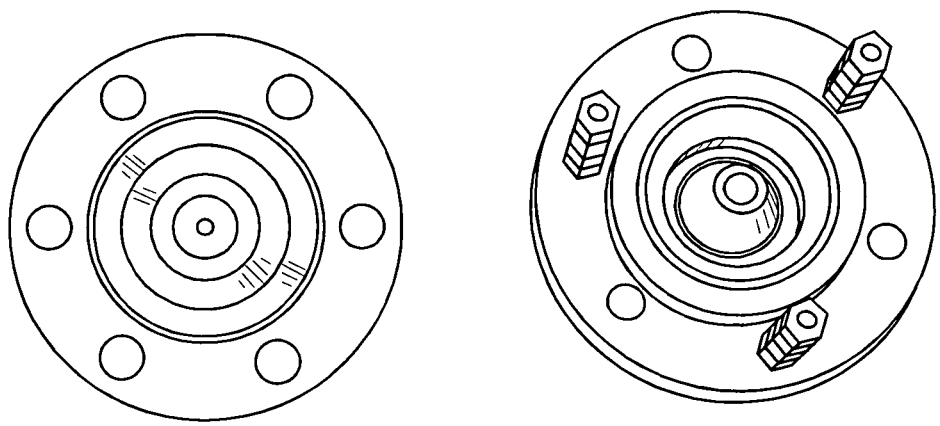
FIG. 1 is a miniature toroidal RF ion trap analyzer with filament endcap removed to expose the ion storage region.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

One analyzer configuration that offers increased ion storage over other designs and is amenable to miniaturization is the toroidal RF ion trap. The toroidal RF ion trap can be viewed as either a conventional 3D ion trap cross section that has been rotated on an edge through space, or as a linear quadrupole curved and connected end to end. In either case, distortions to the quadrupole trapping field introduced by the curvature of the storage region degrade the performance of the device and necessarily require corrections to the shape of the electrodes in order to generate the necessary trapping field. The result of the field corrections is a first-order, two-dimensional quadrupole trapping field with a slight non-linear (primarily octapole) field contribution intentionally added to improve the ion ejection characteristics.

Because of its geometry, the toroidal RF ion trap stores ions in a relatively large volume by distributing them within a circular storage ring. miniature ion trap mass analyzer based on the previously reported toroidal RF ion trap geometry has been fabricated and preliminary data have been obtained.

The miniature analyzer employs the same optimized geometry (asymmetrically shaped electrodes) as its larger predecessor. Because of the reduced radial dimension ($r_0$) of the toroidal RF ion trap, it operates at a considerably lower RF voltage (V) as can be seen because of the inverse relationship between the radius of the device and the RF operating voltage.

Despite the reduced radial dimension, the miniature toroidal RF ion trap has approximately the same ion storage volume as a full size, commercial ion trap mass spectrometer with a 1 cm radial dimension. However, instead of operating at RF voltages of ca. 15 $kV_{p-p}$, as in the case of commercial ion traps, this device operates on the order of 1 kV.

The toroidal RF ion trap geometry offers some unique advantages as a miniature mass analyzer. As an ion trap, it retains all of the advantages discussed earlier (i.e. size, simplicity of electrodes, pressure tolerance, $MS^n$, etc.). All ions are contained within a single trapping field so, unlike arrays, there is no concern in matching the individual arrays or in interfacing ion sources or detectors to ensure equal illumination or sampling from each cell of the array. In fact, the circular form offers a compact geometry which can be easily interfaced to ionizers and electron multiplier detectors.

Finally, in contrast to conventional linear quadrupole ion traps, the trapping field is homogeneous throughout the entire trapping volume (i.e. there are no end effects because the trapping volume is annular) and all ions of a given mass-to-charge ratio (m/z) are simultaneously ejected.

As shown in FIGS. 1-4, the miniature toroidal RF mass analyzer 10 consists of three sections: the ionizer assembly 12, the trapping region 14 and the detector assembly 16.

The ionizer assembly 16 is an ion source for the mass analyzer. Thus, the ion source includes all means for creating ions externally and generating them within the trapping volume, as understood by those skilled in the art.

Figure 2:
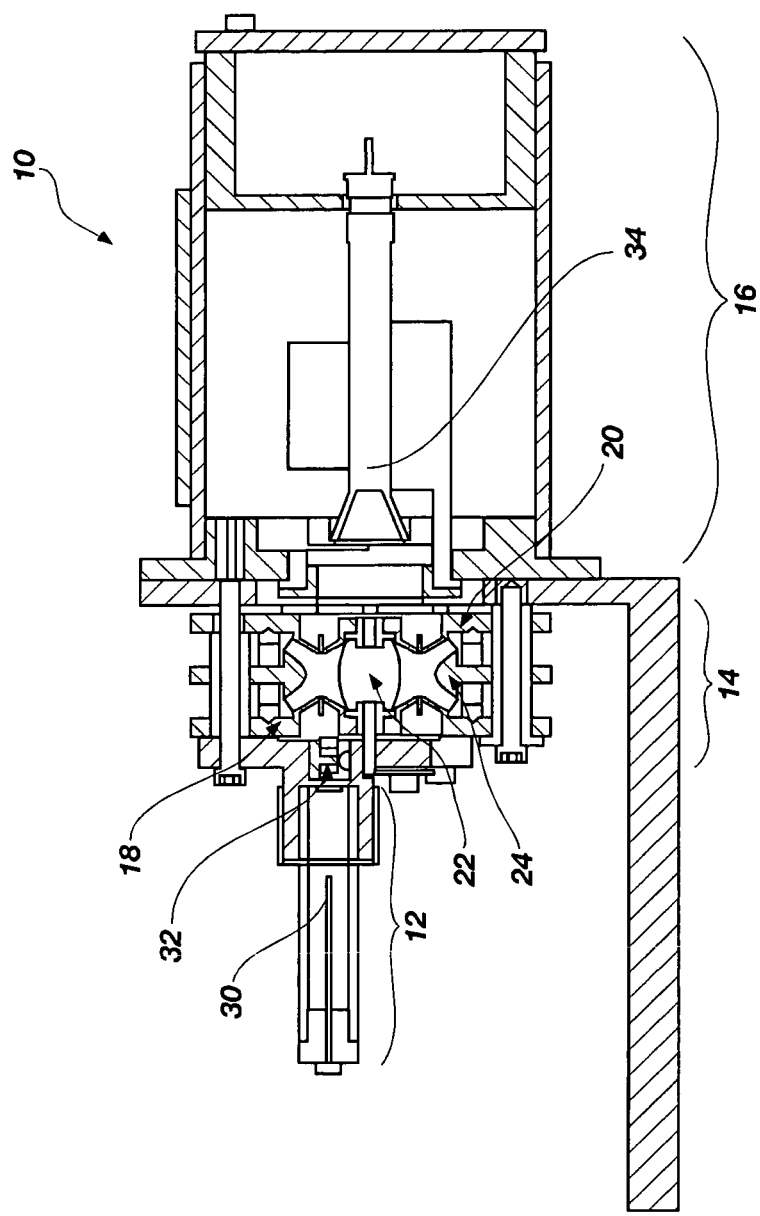
FIG. 2 is Cross-section schematic of the miniature toroidal RF ion trap analyzer showing the major components.

The trapping region 14 is formed from four separate electrodes (a filament endcap 18, a detector endcap 20 an inner ring electrode 22 and an outer ring electrode 24) as can be seen in the photograph of FIG. 1 and in the cross-sectional diagram in FIG. 2. The names of the four electrodes 18, 20, 22, 24 arise historically from their 3D trap origin and indicate their location in the assembly (i.e., the filament endcap 18 is the electrode closest to the ionizer; the detector endcap 20 is closest to the detector, etc.). While the 3D ion trap character would still allow the traditional 'axial' and 'radial' dimension terms to be valid if only the cross-sectional trapping geometry is considered, a linear quadrupole model is seemingly more appropriate.

For purposes of convention, the x-dimension is defined here as the non-ejection dimension (towards the inner and outer rings 22, 24), the y-dimension is defined as the ejection dimension (towards the filament endcap 18 and the detector endcap 20) and the z-dimension is tangential to the toroidal trapping field. The electrodes 18, 20, 22, 24 were precision machined from 316 stainless steel with machine tolerances specified to 0.0005 inch. The dimensions of the toroid assembly 10 were scaled to ⅕ of the size of the original (full-size) version and retained the same shaped corrections to the trapping field that were determined for the original version. The radius ($r_0$) of the miniature device is 0.2 cm. Spacers were machined from alumina or Vespel™ and provide slits to allow gas conductance in and out of the trapping region. Entrance and exit slits with dimensions of 0.28 mm were machined into the two endcaps 18, 20 using a plunge electro-discharge machining (EDM) technique to allow the ionization electrons to enter into the trapping region 14 and ejected ions to exit to a detector in the detector assembly 16.

It is believed that the miniature toroidal RF ion trap mass analyzer can be scaled to an even smaller size, from ½ to perhaps as small as ⅕₀ the size of a conventional 3D configuration.

A miniature electron gun 30 was designed to focus source electrons, formed by emission from a heated filament, through a three-element Einzel lens 32 and then through a small section of the annular endcap slit. The middle lens (L2) of the electron focusing assembly also acted as a gate to turn the ionization on or off. A custom circuit was designed to vary the L2 voltage between −50 V (ionization off) and +125 V (ionization on). A current controlled power supply (Lambda, Model LPT-7202-FM) provided both the nominal 20 eV electron energy and the nominal 1.5 A filament current.

Because of the smaller analyzer size, a conventional, more rugged continuous dynode electron multiplier detector (CDEM) 34 was used in place of a microchannel plate detector previously used in the original version. A custom CDEM (Detector Technologies) was developed to provide >$10^5$ gain at roughly 1 kV for pressures up to $10^{-2}$ mbar. A custom circuit provided a gating voltage on a lens element between the detector endcap and the electron multiplier. This circuit switched between a detector gate closed and a detector gate open configuration. A high voltage power supply (Bertan/Spellman, Model 230) provided the detector bias.

The RF trapping field was established using a custom-built, class C self-resonant tank circuit with a nominal frequency of 1.9 MHz. The RF signal was applied to both the inner ring 22 and outer ring 24. The amplitude of the RF trapping voltage was typically ca. 100-200 $V_{p-p}$ during the ionization and ion cooling portions of the scan. During mass analysis, the RF amplitude was then scanned over the course of 200 ms to ca. 700-1200 $V_{p-p}$ depending on the mass range desired. At the end of each scan, the RF amplitude was turned off for a short (5 ms) time period to allow all remaining ions to leave the trap prior to the next scan. An arbitrary waveform generator (Agilent, Model 33250A) was used to provide the resonant ejection frequency (900 kHz, 8 $V_{p-p}$) during the RF scan to produce the spectrum. This signal was applied to both endcaps 18, 20 through a custom Balun amplifier which also contained a DC offset circuit to allow variations in the Mathieu 'a' parameter.

Figure 3:
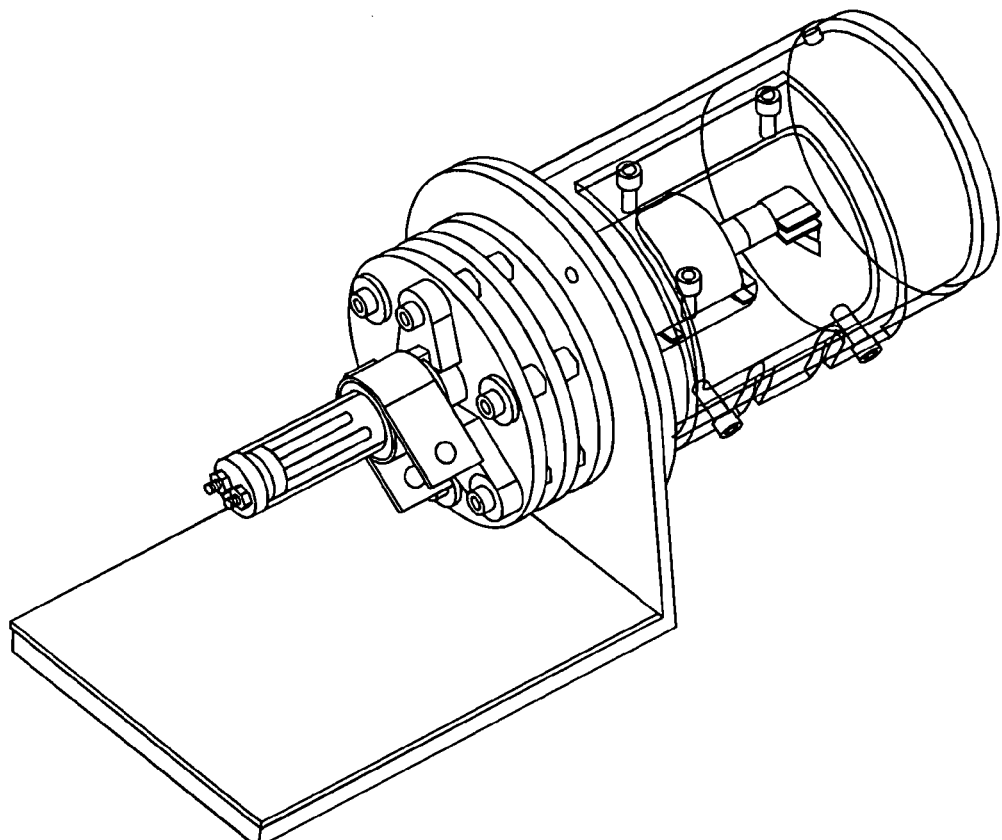
FIG. 3 is a transparent schematic of the miniature toroidal RF ion trap analyzer.
Figure 4:
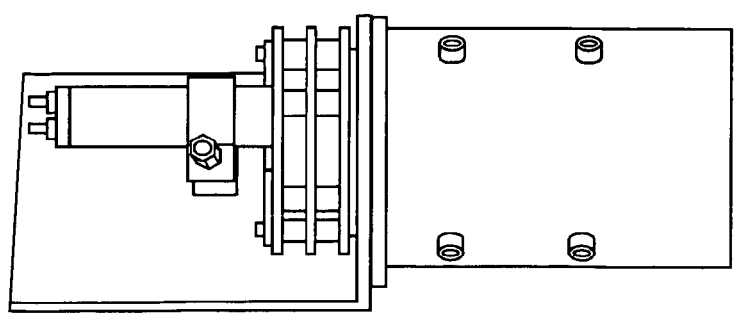
FIG. 4 is a photograph of the miniature toroidal RF ion trap analyzer.

The entire mass spectrometer analyzer 10 shown in FIG. 3 is only 5 cm in diameter and 10 cm long, including the ionizer assembly 12 and the detector assembly 16 which currently comprise the major portions of the length. The mass spectrometer was enclosed in a custom vacuum chamber pumped by a 230 L/s turbo pump (BOC Edwards, Model EXT255) backed by a 20 $m^3$/h mechanical pump (BOC Edwards, Model E2M18). Pressures were monitored using a full range cold cathode vacuum gauge and controller (Pfeiffer, Model FJKR 251/261). All pressure readings are reported as uncorrected values.

Samples were introduced neat, directly into the vacuum chamber through either precision needle valves (Nupro/Swagelok) or variable leak valves (GranvillePhillips). All samples were reagent grade as supplied by the manufacturer.

A simple, four-segment scan function was used to acquire data. A period of ionization (10-100 ms) was followed by a period of ion cooling (ca. 10-30 ms). The third segment of the scan function ramped the RF to perform the mass analysis, followed by a period of time (ca. 5 ms) during which the RF was turned off and all ions were eliminated from the trapping volume 14 in preparation for the next scan. The timing of the scan function segments was controlled by a PIC-16C770 (Microchip Technology) digital microcontroller. The PIC was programmable through an $I^2C$ interface. A Windows-based control program, Aardvark $I^2C$ Control Center (Total Phase), was used to set the timing values in the PIC. The digital I/O outputs from the PIC were then used to control the initiation of the signal acquisition integrator, the start of the RF ramp, the control of the arbitrary waveform generator, the gating of the ionizer and detector, and the RF on/off status.

A multifunction data acquisition (DAO) board (National Instruments Model 6115, Austin, Tex.) coupled with a multiport connector panel (National Instruments, Model BNC 2110) was used to provide a variable modulation voltage to the RF generator to control the RF ramp. Signal from the detector was integrated using a custom preamplifier and sent to either a digital oscilloscope (Agilent, Model 64522A) or to the DAO board where it was digitized by one of the analog-to-digital channels of the multifunction DAO.

A synchronization pulse started both the signal integrator and the RF ramp simultaneously. The signal integrator operated at 30 kHz and provided a digitized signal intensity every 33.3 μs. A typical RF scan would cover approximately 300 daltons in 200 ms, allowing approximately 0.67 ms per dalton. Therefore at 30 kHz, there were approximately 20 samples acquired across each nominal mass. The number of signal integrations in the output was linear with time and, therefore, the signal integrator count was used to calibrate the mass scale for the acquired data.

Operator input and data output were controlled and displayed on a custom instrument control screen programmed in Labview 7.1 (National Instruments). Data manipulation for display included spectral averaging (typically 4-8 scans), Hanning filtering, and shot-noise rejection. All data shown in later figures are direct screen dumps from the acquired signal as displayed on the user interface.

Since the toroidal RF ion trap 10 is a two-dimensional trapping device, and if the field corrections employed to compensate for distortions introduced by the analyzer curvature are adequate, the cross-sectional trapping field should look very much like a linear quadrupole. The implications of this are that, unlike traditional 3D ion traps, q-values (and therefore β-values) for the x and y dimensions should be the same. This requires, therefore, that the ion's secular frequency in the x and y dimension are similar, if not the same. Because a significant contribution of higher order fields is expected to be present (introduced intentionally or unintentionally), coupling of the ion motion in the x and y dimensions is expected. Energy coupled into the ion's y-dimension motion during resonance ejection can subsequently be coupled into the x-dimension motion, causing a spreading of the ion cloud during mass analysis. It was found that adding a small direct current (dc) voltage to either the endcaps 18, 20 or the ring electrodes 22, 24 improved the mass resolution in the acquired data. A dc component alters the Mathieu 'a' parameter in the stability equations. Because in a 2D quadrupole device, $β_x=β_y$ only for a-values of zero, any a-value change will separate the $β_x$ and $β_y$ parameters (and correspondingly, separate the x and y secular frequencies). Typically, a negative voltage (ca. −1 volt) was applied to both endcaps 18, 20 through the Balun box during operation to accomplish this.

Figure 5:
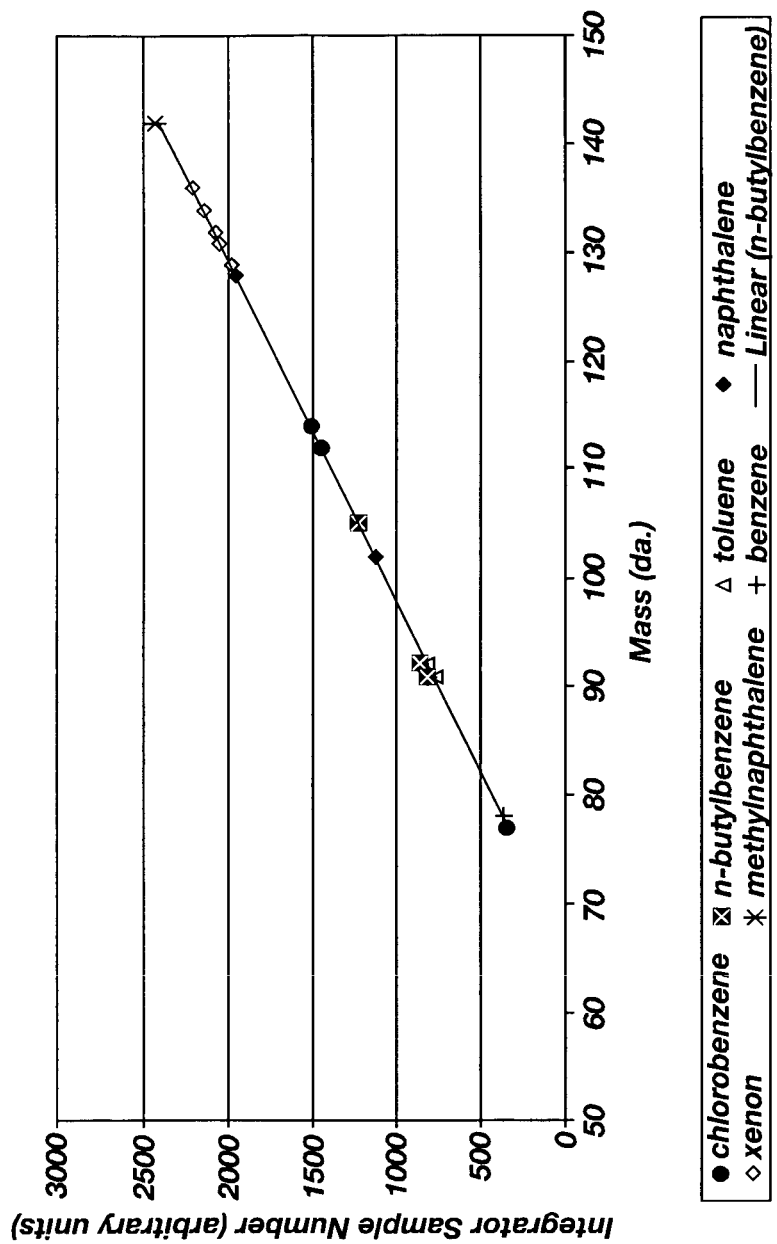
FIG. 5 is a mass calibration using seven compounds.

Mass spectral data were obtained for seven different samples (benzene, n-butylbenzene, toluene, chlorobenzene, naphthalene, xenon and toluene) and used to create the mass calibration graph shown in FIG. 5. Since the RF amplitude was scanned linearly and the sample integrator was initiated at the beginning of the RF ramp, there is a direct linear relationship between the sample integrator number and RF amplitude. The calibration table shows the expected linear relationship between mass and RF amplitude.

Figure 6:
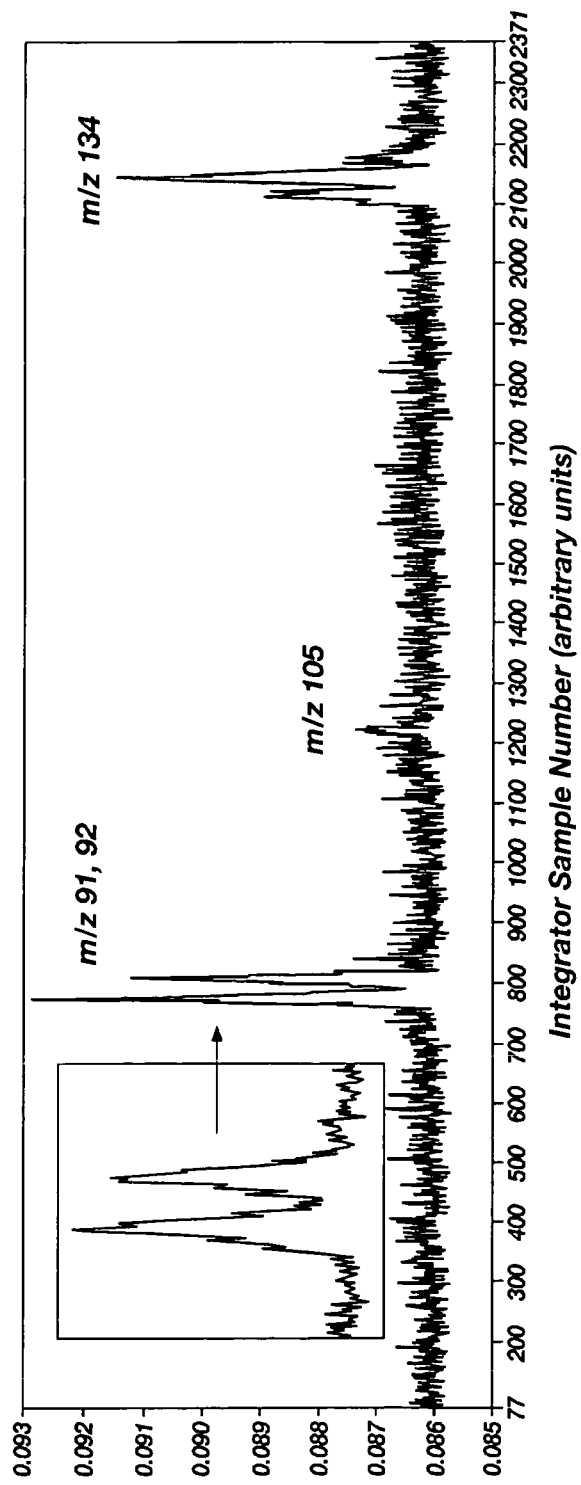
FIG. 6 is a spectrum acquired for n-butylbenzene. FWHM mass resolution for the m/z 91 peak is 0.4 da.

The spectrum obtained for n-butylbenzene (sample pressure $1×10^{-5}$) mbar, uncorrected) is shown in FIG. 6. The inset shows the peak doublet at m/z 91/92 which is clearly resolved. Measurement of the mass resolution for the peak at m/z 91 yielded 0.4 da. full-width, half-maximum (FWHM). The spectrum was obtained by scanning the RF amplitude from 190-1200 $V_{p-p}$ in 200 ms. The RF frequency was 1.9 MHz and a resonant ejection frequency of 900 KHz (corresponding to an approximate $β_{eject}$—value of 0.95) was used to eject ions during the RF amplitude scan. A DC offset of −890 mV was applied to the endcaps 18, 20 (i.e., a≠0 during the RF scan.

Figure 7:
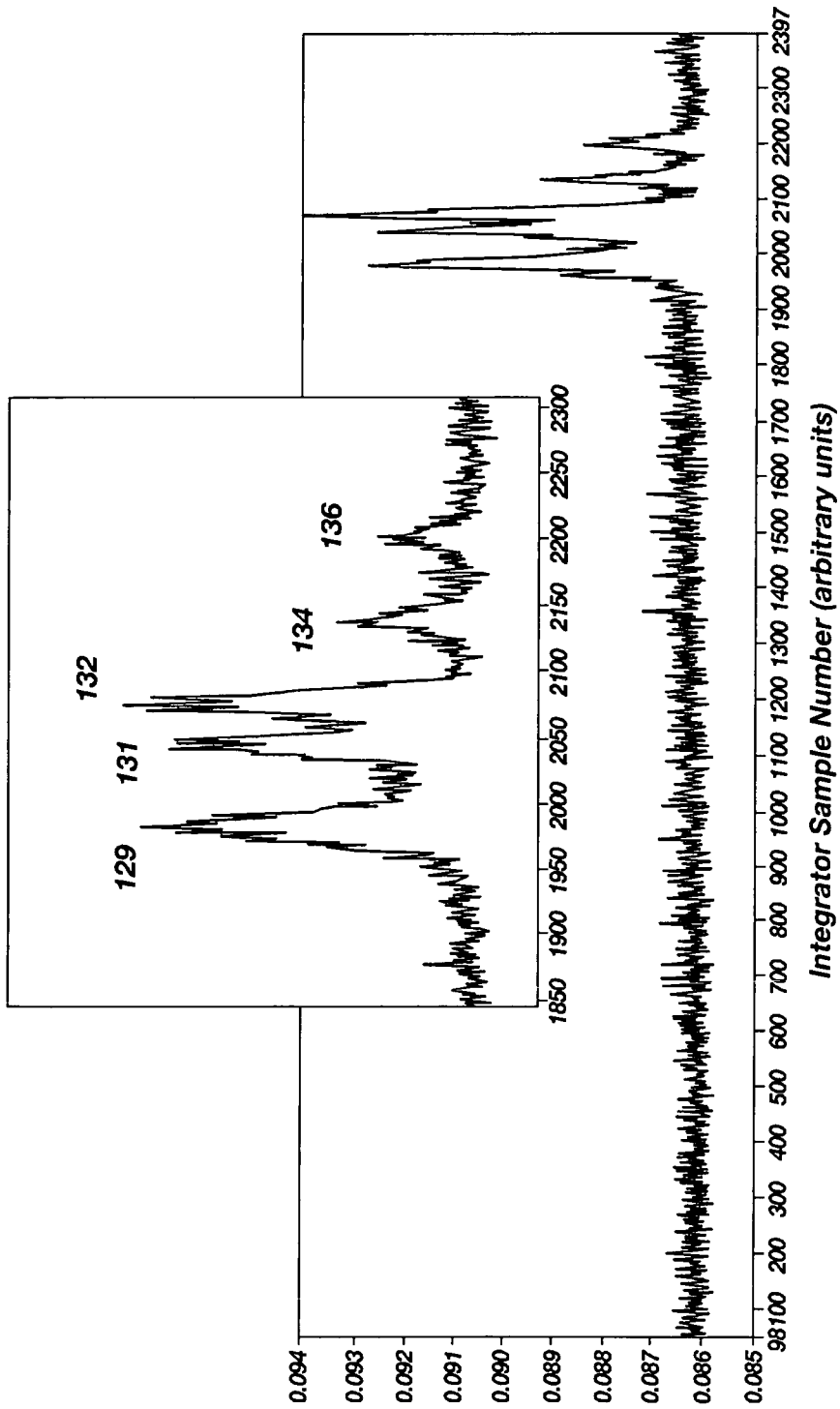
FIG. 7 is a spectrum acquired for xenon showing resolution of all xenon isotopes.
Figure 8:
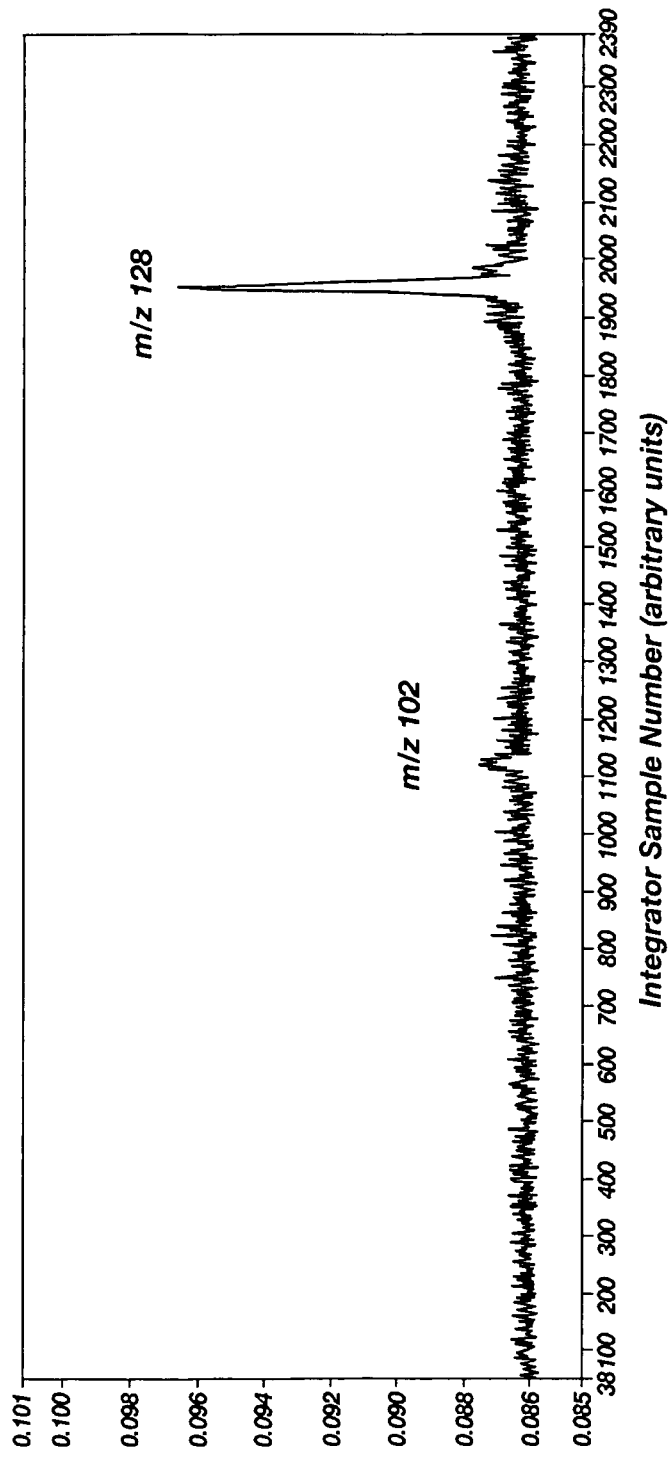
FIG. 8 is a spectrum acquired for naphthalene at low sample pressure and short ionization time.

FIG. 7 shows the spectrum obtained for xenon. The expected isotope pattern is observed and each of the isotopes is clearly resolved. Despite the early stage of development, high signal-to-noise spectra were obtained for samples with pressures as low as $2 \times 10^6$ mbar and ionization times as low as 20 ms. The spectrum for naphthalene under these conditions is shown in FIG. 8. The minor peak in the naphthalene spectrum at m/z 102 is still clearly observable.

Further miniaturization of the toroidal RF ion trap mass analyzer is limited to a large degree by machining tolerances. As noted above, the electrode dimensions during machining were specified to 0.0005 inch tolerances which are at or near the limits for current machining capabilities. The importance of tolerances in this device was highlighted during the development when a prototype analyzer was improperly cleaned using a traditional aluminum oxide polishing method. The shape of the outer ring electrode 24 was altered during the cleaning by approximately 0.005 inches, as measured by a coordinate measuring machine, which resulted in complete loss of ion signal when the system was reassembled and tested. Replacing the outer ring electrode 24 restored normal system performance.

Further improvements in mass resolution are possible as efforts continue to optimize operating parameters, including the RF drive frequency, $\beta_{eject}$—value, and the Mathieu a-value (from applying DC offset to the endcaps). In addition, further improvements in the RF amplifier (higher frequency, increased frequency and amplitude stability) will also provide improved mass resolution, which may allow the currently slow scan speed to be increased without sacrificing unit mass resolution. As a prototype system, cabling and shielding was not optimized, leading to a higher than desired system electronic noise level.

Finally, additional trapping field simulations can be employed using electric field analysis programs such as Femlab™ or POISSON™ (Los Alamos National Laboratory) in order to further refine the quality of the toroidal trapping field. Previous efforts in geometry optimization on the full-sized version focused only on one dimension of the trapping field, namely the ejection (y) dimension. It is known that the non-ejection dimension (x) still has a significant non-linear character.

It should be remembered that the dimensions of the toroidal RF ion trap mass analyzer as described above are for illustration purposes only. The present invention should not be considered to be limited by the specific dimensions or other operational parameters given, but should be regarded as one example only. Many dimensions and operational parameters may be modified and the mass analyzer will still operate as desired, in accordance with the understanding of those skilled in the art.

Given the fact that a miniature toroidal RF ion trap analyzer has been previously taught in the prior art, it is appropriate to discuss improvements in its design that enable the analyzer to perform in an optimized manner.

In a first embodiment of the present invention, it is noted that a means must be provided wherein ions are admitted into and exit from the trapping region 14 as defined by the end caps 18, 20 and the inner ring 22 and the outer ring 24. Ion admission and ejection is accomplished by means of slits and recessed bridges in the filament endcap 18 and the detector endcap 20.

As the analyzer dimensions of ion trap mass analyzers become increasingly smaller, machining and other field imperfections can increase in their significance causing deleterious effects on the trapping and mass analysis capabilities of the ion trap. Discontinuities in the trapping field manifest themselves as perturbations to the desired essentially quadrupolar trapping field. A homogenous trapping field requires that the electrode surfaces be the same throughout the entire trapping volume. However, in order to provide for electron or ion admission into the trapping volume during ionization and mass ejection to the detector during scan out, slits are cut in the filament endcap 18 and the detector endcap 20. In order to maintain a connection between the inner portion 42 and outer portion 44 of the filament and detector endcaps 18, 20, the slits cannot be cut through the entire cylindrical revolution. A bridge is therefore provided between the inner portion and the outer portion 44.

Figure 9:
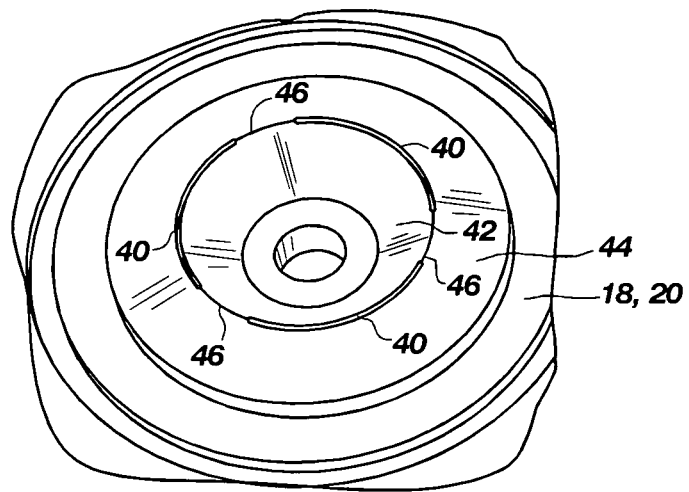
FIG. 9 is a perspective view of an endcap (filament or detector) having three slits and no recessed bridge.

FIG. 9 is provided as a perspective view of an endcap, wherein the filament endcap 18 and the detector endcap 20 must both allow ions to pass therethrough. Accordingly, the endcap shown (either the filament endcap or the detector endcap 20 hereinafter) has three slits 40 that essentially create an inner portion 42 and an outer portion 44. Note that in this figure, the three bridges 46 are not recessed below a surface of the endcap, but are level with the surfaces of the inner portion 42 and the outer portion 44. It is important to understand that the number of slits through the endcap can be modified as needed, and the number of three shown in this embodiment is not a limiting factor of the present embodiment.

Figure 10:
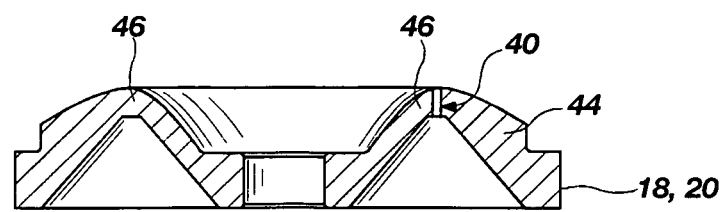
FIG. 10 is a cross-sectional view of the matter of FIG. 9.

FIG. 10 is provided as a cross-sectional view of the endcap shown in FIG. 9. The slit 40 completely separates the inner portion 42 and the outer portion 44. The bridge 46 is shown as being level with the surface of the inner portion 42 and the outer portion 44. These bridges 46 (when at the surface of the trapping field or endcap electrodes) produce discontinuities in the trapping field and thus it is desirable to minimize their effects.

Figure 11:
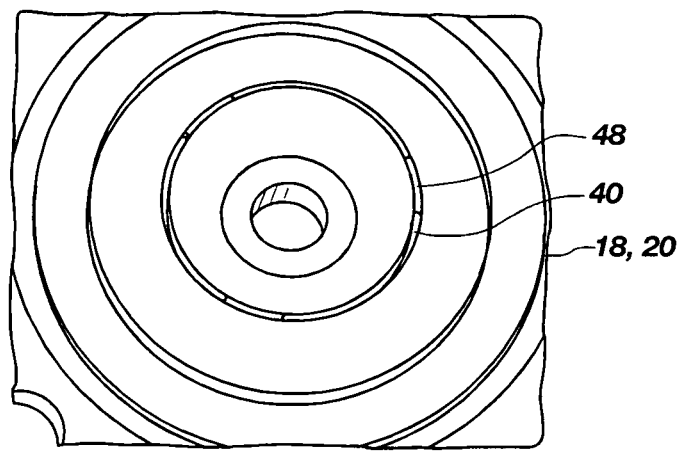
FIG. 11 is a perspective view of an endcap (filament or detector) having three slits and three recessed bridges.
Figure 12:
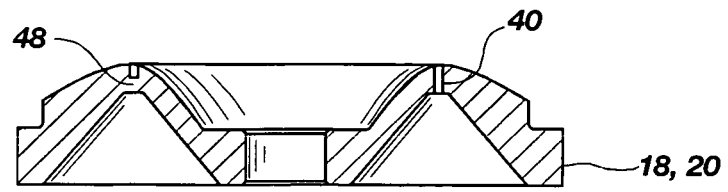
FIG. 12 is a cross-sectional view of the matter of FIG. 11.

FIG. 11 is provided as a perspective view of the endcap still having three slits 40. However, the three bridges 48 are now recessed below a surface of the endcap. The recessed bridges 48 are visible more clearly in the cross-sectional view of the endcap shown in FIG. 12. The first embodiment of the present invention thus includes a slit that is a complete 360° circle that only partially penetrates the full thickness of the endcap electrodes. When used, the mechanical bridges 48 are recessed within the slits 40. During ion storage in the trapping region 14, the ions see a uniform slit 40 in the immediate vicinity of the trapping field and in this fashion, the effects of the bridges 48 on the trapping field are minimized.

In a second embodiment, it is another aspect of the present invention to optimize the size of the miniature toroidal RF ion trap analyzer. Traditional, full-size commercial 3D ion trap mass analyzers have a trapping chamber radius on the order of 1 cm. As such, the maximum RF voltage applied to the ring electrode for a maximum mass range of 650 da, and an operating frequency ($\Omega$) of 1.1 MHz is approximately 15 kV$_{p-p}$. In contrast, a toroidal ion trap geometry with the same radial dimension and an approximate 3:1 ratio between the radius of the torus (R) to the radius of the cross-sectional trapping field ($r_0$) would have roughly 400 times more ion storage volume than the conventional 3D analyzer. This higher ion capacity can be traded against analyzer size. In other words, a toroidal RF ion trap with approximately the same storage volume as an ion trap of conventional design can be much smaller. For the reasons described above, the resulting smaller ion trap operating parameter is determined by the linear quadrupole Mathieu Stability Equation below:

$$q_u = -\frac{4 \cdot e \cdot V}{m \cdot r_0^2 \cdot \Omega^2} \qquad \text{Equation 2}$$

As the volume of the ion trap is reduced by scaling the radius of the trapping field ($r_0$), the RF voltage (V) required to maintain the same trapping conditions is reduced by the square of the change in $r_0$. Considerations for the amount of size reduction include 1) ion optic coupling with the entrance cone of the detector and 2) mass range and RF maximum operating voltage. The reduction of $r_0$ leads not only to a smaller mass analyzer, but a lower RF operating voltage also. A value of $r_0$ can be selected such that the approximate ion storage capacity of the reduced toroidal RF ion trap analyzer is similar to that of a conventional, 3D commercial ion trap with a 1 cm radius.

Optimization of the size of the mass analyzer should also be understood as an enhancement of capabilities. A smaller mass analyzer will be easier to move ions into a trapping volume, and out to a detector.

In a third embodiment of the present invention, it is another aspect of the invention that it is desirable to protect the detector from ions both inside and outside the trapping volume during ionization. There are several sources of these ions. For example, during the ionization event, a large ion current reaches a detector in the detector assembly 16 either indirectly (by scattering), through the ion trap analyzer, or due to the formation of ions whose stability parameters are outside the stability boundary and as such they are immediately ejected from the trap and into the detector. This excess, non-mass analyzed current has the deleterious effect of shortening the life of the detector. It is desirable to prevent detector signal during ionization to thereby increase the life of the detector.

One approach to address this problem is to turn the detector off during ionization and then back on for the subsequent mass analysis scan. Switching the detector voltages on and off, however, is slow at the operating voltages of typical detectors (>1 kV) and thereby reduces the duty cycle of the system.

Transmission grids can adequately block the passage of ions to the detector, but they also have the deleterious effect of attenuating the signal during the mass analysis portion of the analytical scan. Thus, it is advantageous in the present embodiment to include an annular detector gate that when biased, prevents a beam of ions from entering the detector assembly 16.

Figure 13:
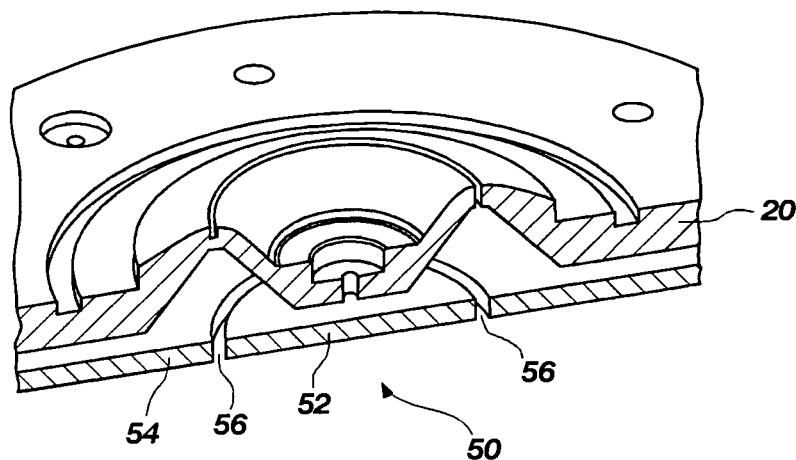
FIG. 13 is a perspective view of the detector endcap with a detector gate to protect the detector.
Figure 14:
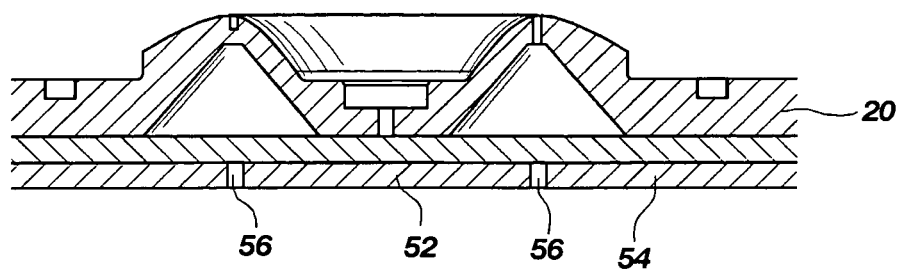
FIG. 14 is a cross-sectional view of the matter of FIG. 13.

FIG. 13 is provided as a perspective view of the annular detector gate 50. FIG. 14 is provided as a cross-sectional view. Bipolar voltages (+/−) are applied to the inner 52 and outer 54 portion of the gate 50 during ionization to deflect the ejecting ions away from the slit. When the voltages on both portions 52, 54 of the gate 50 are switched to the same polarity (typically ground or slightly negative), the gate may act as a lens to help focus the beam into the detector. However, the gate may not focus the ions, but just enable their transmission to the detector.

In addition, the detector gate slits 56 are arranged such that there is no line-of-sight from the filament to the detector region as a bridge in the detector gate effectively blocks that path. Since the use of the gate allows the detector voltage to remain on during the entire scan, this 'bridge' alignment also helps reduce the amount of detector signal during ionization.

Along with prolonging the life of the detector, the detector gate provides other benefits. For example, using the detector gate allows the detector to remain on. By keeping the detector on, the finite amount of time that would otherwise be required to turn on and turn off the high voltage power supply to the detector is eliminated from the duty cycle of the mass analyzer. An increased duty cycle of the analytical scan is the result.

Another benefit of the detector gate is the reduction in latent noise of the system, as understood by those skilled in the art.

Figure 15:
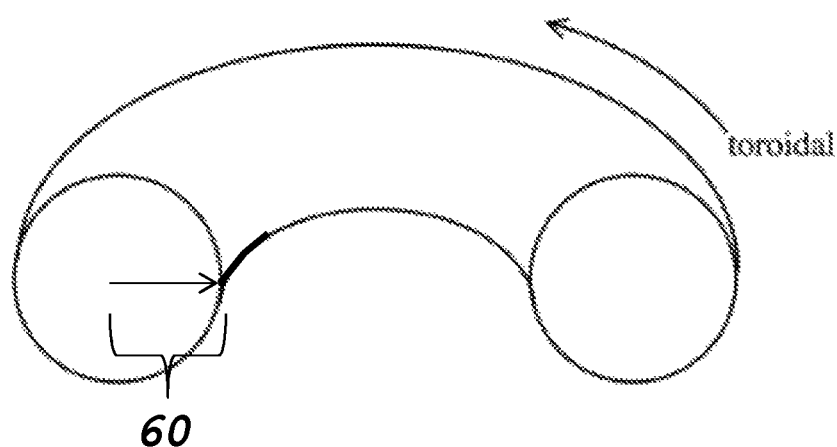
FIG. 15 is a perspective and cross-sectional view of the toroidal trapping volume.

FIG. 15 is a perspective and cross-sectional view of the toroidal trapping volume that is found within the miniature ion trap mass analyzer of the present invention, illustrating the location of the radius of the toroidal trapping volume $r_0$ (60).

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

The invention claimed is:

1. A method for separating ions according to mass-to-charge ratios of charged particles and charged particles derived from atoms, molecules, particles, sub-atomic particles and ions, using a miniature toroidal radio frequency (RF) ion trap mass analyzer, said method comprising:
   1) providing a trapping volume including a filament endcap, a detector endcap, an inner ring on a first wall of a toroidal shape and an outer ring on a second wall of the toroidal shape, the inner ring and the outer ring having asymmetry with respect to each other, to thereby generate a quadrupolar trapping field for storing ions, a radius of the trapping volume $r_0$ being ½ to 1/50 that of a full-scale toroidal RF ion trap mass analyzer that has a value for $r_0$ that is approximately 1 cm; and
   2) minimizing discontinuities in the quadrupolar trapping field by disposing an annular revolution through the endcaps formed by a plurality of alternating slits and bridges in the filament and the detector endcaps for the injection and ejection of ions, wherein the plurality of bridges are recessed below a surface of the filament and detector endcaps and wherein the plurality of bridges provide support between an inner portion and an outer portion of the endcaps.

2. The method as defined in claim 1 wherein the method further comprises providing a detection means for detecting ions that are ejected from the trapping volume through the detector endcap.

3. The method as defined in claim 1 wherein the method further comprises providing an ion source for creating and introducing ions into the trapping volume through the filament endcap.

4. The method as defined in claim 1 wherein the method further comprises reducing the power requirements of the miniature toroidal RF ion trap mass analyzer because of the reduced size thereof.

5. The method as defined in claim 1 wherein the method further comprises manufacturing the miniature toroidal RF ion trap mass analyzer such that it is always suitable for use in portable applications.

6. The method as defined in claim 1 wherein the method further comprises providing a detection means for detecting ions that are ejected from the trapping volume through the detector endcap.

7. The method as defined in claim 1 wherein the method further comprises providing an ion source for creating and introducing ions into the trapping volume through the filament endcap.

8. A method for separating ions according to mass-to-charge ratios of charged particles and charged particles derived from atoms, molecules, particles, sub-atomic particles and ions, using a miniature toroidal radio frequency (RF) ion trap mass analyzer, said method comprising:
1) providing a trapping volume including a filament endcap, a detector endcap, an inner ring on a first wall of a toroidal shape and an outer ring on a second wall of the toroidal shape, the inner ring and the outer ring having asymmetry with respect to each other, to thereby generate a quadrupolar trapping field for storing ions, a radius of the trapping volume $r_0$ being ½ to 1/50 that of a full-scale toroidal RF ion trap mass analyzer that has a value for $r_0$ that is approximately 1 cm; and
2) disposing a detector gate between the detector endcap and a detection means, the detector gate including a bridge that prevents line-of-sight travel of ions from the detector endcap to the detection means, wherein the detector gate controls a flow of ions from the trapping volume to the detector to thereby prolong life, reduce latent noise, and improve the duty cycle of the detection means.

9. The method as defined in claim 8 wherein the method further comprises providing a detector for detecting ions that are ejected from the trapping volume through the detector endcap.

10. The method as defined in claim 8 wherein the method further comprises providing an ion source for creating and introducing ions into the trapping volume through the filament endcap.

11. The method as defined in claim 8 wherein the method further comprises providing an annular detector gate comprised of an inner portion and an outer portion.

12. The method as defined in claim 11 wherein the method further comprises:
1) biasing the inner portion and the outer portion of the detector gate with different potentials to divert ions from the detector; and
2) biasing the inner portion and the outer portion of the detector gate with similar potentials to transmit the ions to the detection means.

13. The method as defined in claim 8 wherein the method further comprises reducing the power requirements of the miniature toroidal RF ion trap mass analyzer because of the reduced size thereof.

14. The method as defined in claim 8 wherein the method further comprises manufacturing the miniature toroidal RF ion trap mass analyzer such that it is always suitable for use in portable applications.

15. A method for separating ions according to mass-to-charge ratios of charged particles and charged particles derived from atoms, molecules, particles, sub-atomic particles and ions, using a miniature toroidal radio frequency ion trap mass analyzer, said method comprising
1) providing a trapping volume including a filament endcap, a detector endcap, an inner ring on a first wall of a toroidal shape and an outer ring on a second wall of the toroidal shape, the inner ring and the outer ring having asymmetry with respect to each other, to thereby generate a quadrupolar trapping field for storing ions, a radius of the trapping volume $r_0$ being ½ to 1/50 that of a full-scale toroidal RF ion trap mass analyzer that has a value for $r_0$ that is approximately 1 cm; and
2) selecting a size for a radius of the trapping volume that will enhance ion optic coupling to an entrance cone of the detector; and
3) minimizing discontinuities in the quadrupolar trapping field by disposing an annular revolution through the endcaps formed by a plurality of alternating slits and bridges in the filament and the detector endcaps for the injection and ejection of ions, wherein the plurality of bridges are recessed below a surface of the filament and detector endcaps and wherein the plurality of bridges provide support between an inner portion and an outer portion of the endcaps.

16. The method as defined in claim 15 wherein the method further comprises providing an ion source for creating and introducing ions into the trapping volume through the filament endcap.

17. The method as defined in claim 15 wherein the method further comprises providing an annular detector gate comprised of an inner portion and an outer portion.

18. The method as defined in claim 15 wherein the method further comprises selecting a size for a radius of the trapping volume that considers the effects of mass range of ions and a radio frequency maximum operating voltage.

19. The method as defined in claim 18 wherein the method further comprises aligning a plurality of slits in the detector gate such that there is no line-of-sight from the ion and electron source to the detector to thereby reduce a detector signal during the introduction of ions into the trapping volume.

20. The method as defined in claim 15 wherein the method further comprises reducing the power requirements of the miniature toroidal RF ion trap mass analyzer because of the reduced size thereof.

21. The method as defined in claim 15 wherein the method further comprises manufacturing the miniature toroidal RF ion trap mass analyzer such that it is always suitable for use in portable applications.

22. A method for separating ions according to mass-to-charge ratios of charged particles and charged particles derived from atoms, molecules, particles, sub-atomic particles and ions, using a miniature toroidal radio frequency ion trap mass analyzer, wherein a mass analyzer includes a trapping volume including filament endcap, a detector endcap, an inner ring on a first wall of a toroidal shape and an outer ring on a second wall of the toroidal shape, wherein the inner ring and the outer ring having asymmetry with respect to each other, a quadrupolar trapping field for storing ions, a detection means for detecting ions that are ejected from the trapping volume through the detector endcap, and an ion source for introducing ions into the trapping volume, said method comprising:
1) selecting a size for a radius of the toroidal trapping volume that will enhance ion optic coupling to an entrance cone of the detection means, a radius of the trapping volume $r_0$ being ½ to 1/50 that of a full-scale toroidal RF ion trap mass analyzer that has a value for $r_0$ that is approximately 1 cm; and
2) minimizing discontinuities in the quadrupolar trapping field by disposing an annular revolution through the endcaps formed by a plurality of alternating slits and bridges in the filament and the detector endcaps for the injection and ejection of ions, wherein the plurality of bridges are recessed below a surface of the filament and detector endcaps and wherein the plurality of bridges provide support between an inner portion and an outer portion of the endcaps.

23. A system for separating ions according to mass-to-charge ratios of charged particles and charged particles derived from atoms, molecules, particles, sub-atomic particles and ions, using a miniature toroidal radio frequency ion trap mass analyzer, said system comprised of:

a trapping volume including a filament endcap, a detector endcap, an inner ring on a first wall of a toroidal shape and an outer ring on a second wall of the toroidal shape, the inner ring and the outer ring having asymmetry with respect to each other, a radius of the trapping volume $r_0$ being ½ to 1/50 that of a full-scale toroidal RF ion trap mass analyzer that has a value for $r_0$ that is approximately 1 cm;

a detection means for detecting ions that are ejected from the trapping volume through the detector endcap;

an ion source for introducing ions into the trapping volume through the filament endcap; and an annular revolution through the endcaps formed by a plurality of alternating slits and bridges in the filament and the detector endcaps for the injection and ejection of ions, wherein the plurality of bridges are recessed below a surface of the filament and detector endcaps and wherein the plurality of bridges provide support between an inner portion and an outer portion of the endcaps.

24. A system for separating ions according to mass-to-charge ratios of charged particles and charged particles derived from atoms, molecules, particles, sub-atomic particles and ions, using a miniature toroidal radio frequency ion trap mass analyzer, said system comprised of:

a trapping volume including a filament endcap, a detector endcap, an inner ring on a first wall of a toroidal shape and an outer ring on a second wall of the toroidal shape, the inner ring and the outer ring having asymmetry with respect to each other, a radius of the trapping volume $r_0$ being ½ to 1/50 that of a full-scale toroidal RF ion trap mass analyzer that has a value for $r_0$ that is approximately 1 cm;

a detection means for detecting ions that are ejected from the trapping volume through the detector endcap;

an ion source for introducing ions into the trapping volume through the filament endcap; and a detector gate between the detector endcap and the detection means, the detector gate including a bridge that prevents line-of-sight travel of ions from the detector endcap to the detection means.

25. The system as defined in claim 24 wherein the detector gate is further comprised of an annular detector gate comprised of an inner portion and an outer portion.

26. The system as defined in claim 25 wherein the system is further comprised of a biasing means for biasing the inner portion and the outer portion of the detector gate in a different or like manner to thereby divert ions away from or transmit ions through the detector gate.

27. A system for separating ions according to mass-to-charge ratios of charged particles and charged particles derived from atoms, molecules, particles, sub-atomic particles and ions, using a miniature toroidal radio frequency ion trap mass analyzer, wherein a mass analyzer includes a trapping volume including a filament endcap, a radius of the trapping volume $r_0$ being ½ to 1/50 that of a full-scale toroidal RF ion trap mass analyzer that has a value for $r_0$ that is approximately 1 cm, a detector endcap, an inner ring on a first wall of a toroidal shape and an outer ring on a second wall of the toroidal shape, the inner ring and the outer ring having asymmetry with respect to each other, a detection means for detecting ions that are ejected from the trapping volume through the detector endcap, and an ion source for introducing ions into the trapping volume, said system now including:

an annular revolution through the endcaps formed by a plurality of alternating slits and bridges in the filament and the detector endcaps for the injection and ejection of ions, wherein the plurality of bridges are recessed below a surface of the filament and detector endcaps and wherein the plurality of bridges provide support between an inner portion and an outer portion of the endcaps.

28. A system for separating ions according to mass-to-charge ratios of charged particles and charged particles derived from atoms, molecules, particles, sub-atomic particles and ions, using a miniature toroidal radio frequency ion trap mass analyzer, wherein a mass analyzer includes a trapping volume including a filament endcap, a radius of the trapping volume $r_0$ being ½ to 1/50 that of a full-scale toroidal RF ion trap mass analyzer that has a value for $r_0$ that is approximately 1 cm, a detector endcap, an inner ring on a first wall of a toroidal shape and an outer ring on a second wall of the toroidal shape, the inner ring and the outer ring having asymmetry with respect to each other, a detection means for detecting ions that are ejected from the trapping volume through the detector endcap, and an ion source for introducing ions into the trapping volume, said system now including:

a detector gate between the detector endcap and the detection means, the detector gate including a bridge that prevents line-of-sight travel of ions from the detector endcap to the detection means.

29. The system as defined in claim 28 wherein the detector gate is further comprised of an annular detector gate comprised of an inner portion and an outer portion.

30. The system as defined in claim 29 wherein the system is further comprised of a biasing means for biasing the inner portion and the outer portion of the detector gate in a different or like manner to thereby divert ions away from or transmit ions through the detector gate.

* * * * *